United States Patent
Nakayama et al.

[11] Patent Number: 5,889,740
[45] Date of Patent: Mar. 30, 1999

[54] MAGNETO-OPTICAL RECORDING MEDIUM AND MAGNETO-OPTICAL RECORDING METHOD

[75] Inventors: Junichiro Nakayama; Go Mori, both of Nara; Naoyasu Iketani, Tenri; Akira Takahashi, Nara, all of Japan

[73] Assignee: Sharp Kabushiki Kaisha, Osaka, Japan

[21] Appl. No.: 957,285

[22] Filed: Oct. 24, 1997

[30] Foreign Application Priority Data

Oct. 25, 1996 [JP] Japan .................................. 8-283524

[51] Int. Cl.$^6$ .................................................. G11B 11/00
[52] U.S. Cl. ................................. 369/13; 428/694 MM
[58] Field of Search ............................. 369/13, 14, 110, 369/116; 360/59, 114; 365/122; 428/694 ML, 694 MM

[56] References Cited

U.S. PATENT DOCUMENTS

| | | | |
|---|---|---|---|
| 5,208,797 | 5/1993 | Nakaki et al. | 369/13 |
| 5,623,458 | 4/1997 | Matsumoto et al. | 369/13 |
| 5,787,056 | 7/1998 | Nakayama et al. | 369/13 |

FOREIGN PATENT DOCUMENTS 06012711A 1/1994 Japan .

OTHER PUBLICATIONS

T. Tokunaga, et al., J. Magn. Soc. Japan, vol. 17, Supplement No. S1 (1993), *Exchange–Coupled Quadrilayer Films for Direct Overwrite MO Disks*, pp. 357–362 (no month available).

*Primary Examiner*—Tan Dinh
*Attorney, Agent, or Firm*—David G. Conlin; William J. Daley, Jr.

[57] ABSTRACT

Featured is a magneto-optical recording medium including a first magnetic layer, a second magnetic layer, a third magnetic layer and a fourth magnetic layer formed one on another in this order. The first, second, third and fourth magnetic layers have Curie points Tc1, Tc2, Tc3 and Tc4, respectively, which satisfy the condition of Tc3<Tc1<Tc2<Tc4, and exhibit a perpendicular magnetic anisotropy in a temperature range between room temperature and their respective Curie points. The first magnetic layer is adapted to be copied with the magnetization state of the second magnetic layer at a temperature higher than a first temperature, but not copied at a temperature not higher than the first temperature. The first temperature is defined as a temperature between room temperature and the Curie point Tc1. The third magnetic layer is adapted to be copied with the magnetization state of the fourth magnetic layer at least at room temperature. The second magnetic layer is adapted to be copied with the magnetization state of the third magnetic layer at least at room temperature and to be influenced by a magnetic field from the fourth magnetic layer so as to have a magnetization direction determined by the magnetic field at a temperature higher than the Curie point Tc1.

7 Claims, 14 Drawing Sheets

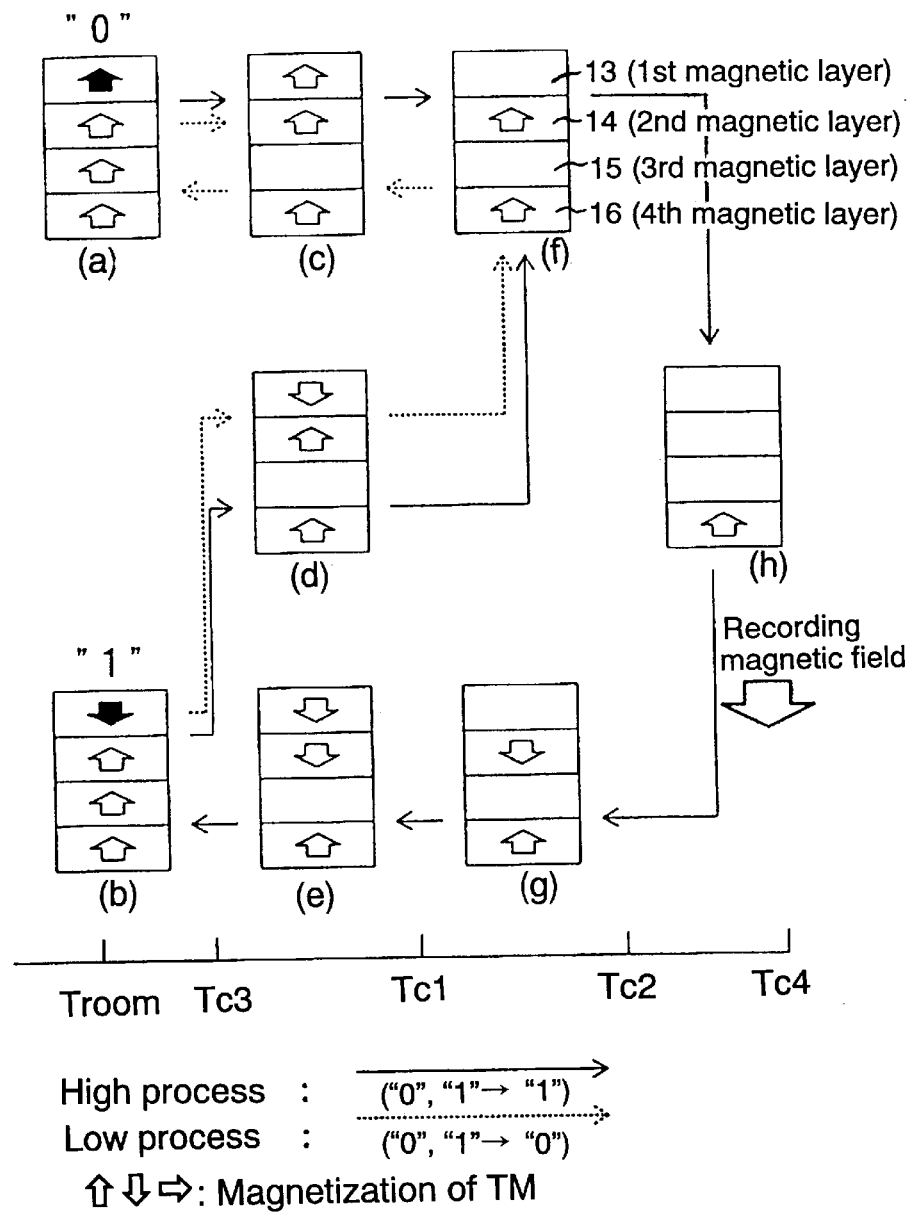

MAGNETO-OPTICAL RECORDING MEDIUM AND MAGNETO-OPTICAL RECORDING METHOD

BACKGROUND OF THE INVENTION

1. Field of the Invention

The present invention relates to a magneto-optical recording medium and a magneto-optical recording method. More particularly, the invention relates to a magnetic-optical recording medium which are advantageously applicable to optical disks, optical tapes, optical cards and the like which can be optically recorded, reproduced and/or erased information thereon, and a magneto-optical recording method using thereof.

2. Description of the Prior Art

Magneto-optical recording techniques typically employ a recording medium having on its substrate a perpendicular magnetized film formed of a magnetic material, and achieve data recording and data reproduction on the recording medium in the following manner.

For the data recording, the recording medium is first initialized by application of a strong external magnetic field so as to be magnetized in one direction (upward or downward). Then, a record site on the recording medium is irradiated with a laser beam so as to be heated to a temperature near the Curie point or higher or near compensation point or higher of the magnetic material. Thus, the coercive force (Hc) in the site is brought to zero or substantially zero. Then an external magnetic field (bias magnetic field) having a magnetization direction opposite to the initial magnetization direction is applied to the recording medium to reverse the magnetization in the site. Upon stopping the irradiation with the laser beam, the recording medium is cooled to room temperature, so that the reversed magnetization is fixed. Thus, data is thermo-magnetically recorded in the record site.

For the data reproduction, the recording medium is irradiated with a linearly polarized laser beam. At this time, the plane of polarization of a reflected or transmitted light component is rotated in accordance with the direction of the magnetization (this phenomenon is known as "magnetic Kerr effect" or "magnetic Faraday effect"). The data readout is optically achieved by utilizing this phenomenon.

Much attention is now focused on the magneto-optical recording techniques for use in large capacity rewritable recording devices. As a reusable (or rewritable) recording medium, a so-called light modulation overwritable medium has been proposed which comprises an exchange-coupled duolayer film and achieves data overwriting with application of an initializing magnetic field (Hi) and a recording magnetic field (Hw) by modulating a light intensity. Another light modulation overwritable medium heretofore proposed comprises an exchange-coupled quadrilayer film and obviates the need for the application of an initializing magnetic field (Hi) (J. Magn. Soc. Jan., Vol. 17, No. S1 (1993) 357).

The light modulation overwritable medium employing an exchange-coupled quadrilayer film has a first magnetic layer 13, a second magnetic layer 14, a third magnetic layer 15 and a fourth magnetic layer 16 as shown in FIG. 19. The temperature dependence of the coercive forces of the respective magnetic layers is shown in FIG. 20. More specifically, the first, second, third and fourth magnetic layers have Curie points Tc1, Tc2, Tc3 and Tc4, respectively, which satisfy the condition of Tc3<Tc1<Tc2<Tc4.

The transition of the magnetization states of the respective magnetic layers during the data recording operation. is explained by FIG. 21, wherein the arrows denote the magnetization direction of a transition metal contained in the magnetic layers.

At room temperature, the data recorded in the recording medium is represented by the magnetization state of the first magnetic layer 13, i.e., either an upward magnetization state (with a logic value of 0 as indicated at (a) in FIG. 21) or a downward magnetization state (with a logic value of 1 as indicated at (b) in FIG. 21). The magnetization of the fourth magnetic layer 16 is always oriented in one direction (upward as seen in FIG. 21), and the magnetization of the second magnetic layer 14 is oriented in the same direction as the magnetization of the fourth magnetic layer 16 with the aid of the third magnetic layer 15.

The data recording is achieved by irradiating the recording medium with a laser beam modulated into either a high power intensity or a low power intensity while applying a recording magnetic field Hw to the recording medium.

The high power laser beam is adapted to heat the recording medium irradiated therewith up to a temperature near the Curie point Tc2 of the second magnetic layer 14. The low power laser beam is adapted to heat the recording medium irradiated therewith up to a temperature near the Curie point Tc1 of the first magnetic layer 13.

Therefore, when the recording medium is irradiated with the high power laser beam, the second magnetic layer 14 as well as the first and the third magnetic layer 13,15 are demagnetized (as indicated at (h) in FIG. 21). The magnetization of the second magnetic layer 14 is reversed by cooling of the recording medium to a temperature below the Curie point Tc2 with applying the recording magnetic field Hw thereto (as indicated at (g) in FIG. 21), and then the reversed magnetization state is copied to the first magnetic layer 13 by interface exchange coupling in the course of cooling of the recording medium (as indicated at (e) in FIG. 21) to the temperature below the Curie point Tc1. Further, the magnetization of the third magnetic layer 15 and the second magnetic layer 14 is oriented in the same direction according to the magnetization of the fourth magnetic layer 16 in the cource of cooling to the room temperature (as indicated at (b) in FIG. 21). Thus, the magnetization of the first magnetic layer 13 is directed downward (with a logic value of 1).

When the recording medium is irradiated with the low power laser beam, the magnetization of the second magnetic layer 14 is not reversed (as indicated at (f) in FIG. 21) by the application of the recording magnetic field Hw because its coercive force is greater than the recording magnetic field Hw, and the magnetization of the first magnetic layer 13 is oriented in the same direction as the magnetization of the second magnetic layer 14 (as indicated at (c) in FIG. 21) by an interface exchange coupling force in the course of cooling of the recording medium. Thus, the magnetization of the first magnetic layer 13 is directed upward (with a logic value of 0). Indicated at (d) in FIG. 21 is a magnetization transition state from a state where the first magnetic layer 13 is downwardly magnetized (with a logic value of 0 as indicated at (b) in FIG. 21) to a state as indicated at (f) in FIG. 21.

A laser power employed for the data reproduction is significantly smaller than that of the low power laser beam and, therefore, does not change the recorded magnetization states of the respective layers.

Thus, the light modulation overwritable magneto-optical recording medium employing the exchange-coupled quadrilayer film obviates the need for the application of the initializing magnetic field Hi, and ensures stabilization of record bits. However, the magneto-optical recording medium is disadvantageous in that the application of the external recording magnetic field Hw is required for the light modulation overwriting.

SUMMARY OF THE INVENTION

The present invention provides a magneto-optical recording medium which comprises a first magnetic layer, a second magnetic layer, a third magnetic layer and a fourth magnetic layer formed one on another in this order, the first magnetic layer, the second magnetic layer, the third magnetic layer and the fourth magnetic layer have Curie points Tc1, Tc2, Tc3 and Tc4, respectively, which satisfy the condition of Tc3<Tc1<Tc2<Tc4, and exhibit a perpendicular magnetic anisotropy in a temperature range between room temperature and their respective Curie points (between room temperature incl. and their respective Curie points excl.), wherein the first magnetic layer is adapted to be copied with the magnetization state of the second magnetic layer at a temperature higher than a first temperature, but not copied at a temperature not higher than the first temperature, the first temperature being defined as a temperature between room temperature and the Curie point Tc1, the third magnetic layer is adapted to be copied with the magnetization state of the fourth magnetic layer at least at room temperature, and the second magnetic layer is adapted to be copied with the magnetization state of the third magnetic layer at least at room temperature and to be influenced by a magnetic field from the fourth magnetic layer so as to have a magnetization direction determined by the magnetic field at a temperature higher than the Curie point Tc1.

According to the present invention, the magneto-optical recording medium enables light modulation overwriting without application of an external magnetic field because the magnetization direction of the second magnetic layer is determined by the direction of a magnetic field from the fourth magnetic layer at a temperature not lower than the Curie point of the first magnetic layer. Therefore, the construction of a magneto-optical recording apparatus can be simplified.

BRIEF DESCRIPTION OF THE DRAWINGS

FIG. 21 is a diagram illustrating the magnetization states of the first to fourth magnetic layers for explanation of a data recording process for the magneto-optical recording medium according to the prior art.

DETAILED DESCRIPTION OF THE PREFERRED EMBODIMENTS

Figure 1:
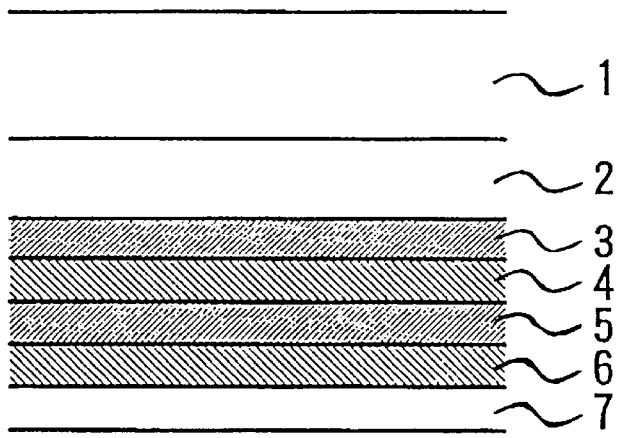
FIG. 1 is a schematic sectional view illustrating the construction of a magneto-optical recording medium according to a first embodiment of the present invention.

A magneto-optical recording medium according to the present invention has first to fourth magnetic layers preferably formed on a substrate.

The substrate of the magneto-optical recording medium is not particularly limited, but examples thereof include a glass substrate, a chemically reinforced glass substrate, a so-called 2P-layered glass substrate having a UV curing resin layer formed on any of the aforesaid glass substrates, and resin substrates such as of polycarbonate (PC), polymethylmethacrylate (PMMA), amorphous polyolefins (APO), polystyrene (PS), polyvinyl chloride (PVC) and epoxy. The surface of the substrate may be either smooth or formed with tracks consisting of pits or grooves and lands.

The first to fourth magnetic layers are sequentially formed on the substrate of the magneto-optical recording medium of the present invention. The first magnetic layer, the second magnetic layer, the third magnetic layer and the fourth magnetic layer have Curie points Tc1, Tc2, Tc3 and Tc4, respectively, which satisfy the condition of Tc3<Tc1<Tc2<Tc4, and exhibit a perpendicular magnetic anisotropy in a temperature range from room temperature to their respective Curie points.

The first magnetic layer is adapted to be copied with the magnetization state of the second magnetic layer at a temperature higher than a predetermined temperature (first temperature) which is defined as a temperature between room temperature and the Curie point Tc1, but not copied at a temperature not higher than the first temperature.

The third magnetic layer is adapted to be copied with the magnetization state of the fourth magnetic layer at least at room temperature.

The second magnetic layer is adapted to be copied with the magnetization state of the third magnetic layer at least at room temperature and to be influenced by a magnetic field from the fourth magnetic layer so as to have a magnetization direction determined by the magnetic field at a temperature higher than the Curie point Tc1.

In order to satisfy the aforesaid conditions required for the first to fourth magnetic layers, it is necessary to properly control the composition (the kinds and proportions of elements) of each of the magnetic layers, and the composition of its underlying and/or overlying magnetic layer.

More specifically, the first to fourth magnetic layers are each preferably formed of a rare earth—transition metal (RE-TM) alloy.

The first magnetic layer exhibits TM rich characteristics. The term "TM rich characteristics" herein means that the sublattice magnetization of the transition metal is dominant over the sublattic magnetization of the earth metal.

The second magnetic layer exhibits RE rich characteristics. The term "RE rich characteristics" herein means that the sublattic magnetization of the rare earth metal is dominant over the sublattic magnetization of the transition metal.

The third magnetic layer exhibits either the RE rich characteristics or the TM rich characteristics.

The composition of the fourth magnetic layer is not particularly limited, but the fourth magnetic layer preferably has its compensation point between room temperature and its Curie point. The fourth magnetic layer preferably exhibits the maximum total magnetization in a temperature range between its compensation point and its Curie point, more preferably at a temperature near the Curie point Tc2 of the second magnetic layer. The term "total magnetization" herein means a total magnetic moment which is a vector sum of sublattice magnetic moments of RE and TM.

The first to fourth magnetic layers are each formed, for example, of an alloy comprising at least one rare earth metal selected from the group consisting of Gd, Tb, Dy, Ho and Nd, and at least one transition metal selected from the group consisting of Fe and Co. For improvement of the environmental stability of the magnetic layers per se, at least one metal element selected from the group consisting of Cr, V, Nb, Mn, Be, Ni, Ti, Pt, Rh and Cu is preferably added to the rare earth—transition metal alloy. The addition of any of the aforesaid metal elements prevents the resulting magnetic-optical recording medium from being deteriorated by oxidation thereof due to invasion of moisture and oxygen, and imparts a long-term reliability to the magnetic optical recording medium.

The first to fourth magnetic layers are each formed in a proper thickness which varies depending on the composition thereof and the proportions of the elements contained therein.

The magneto-optical recording medium of the present invention may further include a dielectric film formed on the surface of the substrate. The dielectric film is preferably transparent. Examples of preferred materials for the dielectric film include AlN, SiN, AlSiN, AlTaN, SiAlON, TiN, TiON, BN, ZnS, TiO2, BaTiO$_3$ and SrTiO3, among which SiN, AlSiN, AlTaN, TiN, BN and ZnS are particularly preferred because these substances contain no oxygen and impart an excellent moisture resistance to the resulting magneto-optical recording medium.

The thickness of the dielectric layer is determined in consideration of a so-called Kerr effect enhancement which increases a polar Kerr rotation angle with respect to the first magnetic layer (or the optionally provided magnetic layer) by a light interference effect. In order to maximize the S/N ratio in data reproduction, it is necessary to increase the polar Kerr rotation angle. Therefore, the thickness of the dielectric layer is controlled so that the polar Kerr rotation angle can be maximized.

Specifically, the thickness of the dielectric layer is about 30 nm to about 200 nm. The dielectric film is effective for the aforesaid Kerr effect enhancement as well as for prevention of oxidation of the magnetic layers. The formation of an AlN dielectric film, for example, is achieved by reactive DC (direct current) sputtering which employs nitrogen gas or a gas mixture of argon and nitrogen with an Al target. The reactive DC sputtering features a faster film formation and, therefore, is more advantageous than RF (radio frequency) sputtering.

The magneto-optical recording medium of the present invention may further include a protective film formed on the side of the fourth magnetic layer. The material for the protective film may be selected from the aforesaid materials for the dielectric film. If the dielectric film and the protective film are formed of the same material, the productivity is improved. The thickness of the protective film is preferably about 1 nm to about 200 nm, for example. The thermal conductivities of the protective film and the dielectric film influence the recording sensitivity characteristic of the magneto-optical recording medium. More specifically, incident light to the magneto-optical recording medium is almost entirely absorbed by the substrate, the optional dielectric layer, the first to fourth magnetic layers serving as absorption films and the optional magnetic film, and converted into heat. The heat in the magnetic layers is conducted to the dielectric film and the protective film. Therefore, the thermal conductivities and heat capacities (specific heats) of the dielectric film and the protective film influence the recording sensitivity characteristic of the magneto-optical recording medium. The term "recording sensitivity characteristics" herein means the magnitude of laser power required for the data recording and data erasing.

This means that the recording sensitivity of the magneto-optical recording medium can virtually be controlled by the thicknesses of the dielectric film and the protective film. In order to increase the recording sensitivity (or to perform the data erasing with application of a laser beam having a lower power), for example, the thicknesses of these films are reduced. In general, a higher recording sensitivity is advantageous for extension of the lifetime of the laser source and, therefore, these films are each formed in a reduced thickness.

The magneto-optical recording medium of the present invention may further include an overcoat film formed on the protective film. The overcoat film is preferably formed of a UV curing resin. The provision of the UV curing resin overcoat film improves the production operativity of the magneto-optical recording medium, and imparts an extremely high moisture resistance and an excellent long-term stability to the magneto-optical recording medium.

The magneto-optical recording medium of the present invention may further include one or more magnetic films which are each optionally provided between the substrate and the first magnetic layer, between the respective magnetic layers, or on the fourth magnetic layer (between the fourth magnetic layer and the protective film). For example, a fifth magnetic layer may be provided between the substrate and the first magnetic layer. A sixth magnetic layer may be provided between the first magnetic layer and the second magnetic layer.

Where the fifth magnetic layer is to be provided, the fifth magnetic layer has a Curie point Tc5 which is preferably higher than the Curie point Tc1 of the first magnetic layer, and preferably adapted to be copied with the magnetization state of the first magnetic layer at least at a temperature not lower than a predetermined temperature (second temperature) which is defined as a temperature below the Curie point Tc1 of the first magnetic layer.

Where the sixth magnetic layer is to be provided, the sixth magnetic layer preferably exhibits a perpendicular magnetic anisotropy of a smaller degree than that of the second magnetic layer or in-plane magnetic anisotropy at room temperature, and is preferably adapted to be copied with the magnetization state of the second magnetic layer, which is in turn copied to the first magnetic layer, at a temperature not lower than a predetermined temperature (third temperature) which is defined as a temperature between room temperature and the Curie point Tc1.

The fifth and sixth magnetic layers are each formed of a rear earth—transition metal alloy like the first to fourth magnetic layers. The thicknesses of the fifth and sixth magnetic layers are each properly selected depending on the composition thereof. For example, the thicknesses of these magnetic layers are about 1 nm to about 50 nm.

Although the magneto-optical recording medium described above is of a so-called single side type, the present invention is also applicable to that of a double side type. The formation of the double side type magneto-optical recording medium is achieved by bonding a pair of single side type magneto-optical recording media with their substrates facing outward and with an adhesive layer held therebetween.

Preferably used as a material for the adhesive layer is a polyurethane acrylate adhesive, which is curable thermally, anaerobically or with application of ultraviolet ray. The use of the polyurethane acrylate adhesive is advantageous in that a portion of the adhesive layer not irradiated with ultraviolet ray behind the recording media can be cured thermally or anaerobically.

The single side type magneto-optical recording medium is advantageously used in a data recording and reproducing device having a reduced size, because the thickness of the recording medium is half that of the double side type magneto-optical recording medium. Conversely, the double side type magneto-optical recording medium is advantageously used in a large—capacity data recording and reproducing device, because the data recording and the data reproduction are permitted on the both sides of the recording medium.

FIRST EMBODIMENT

A magneto-optical recording medium according to a first embodiment of the present invention will hereinafter be explained with reference to FIGS. 1 to 3.

As shown in FIG. 1, the magneto-optical recording medium according to the first embodiment has a transparent dielectric layer 2, a first magnetic layer 3, a second magnetic layer 4, a third magnetic layer 5, a fourth magnetic layer 6 and a protective layer 7 which are sequentially formed on a transparent substrate 1 in this order. The magneto-optical recording medium further includes an overcoat film not shown. The magnetic layers 3 to 5 are each composed of a rare earth—transition metal alloy.

A magneto-optical disk as one example of the magneto-optical recording medium was fabricated in the following manner.

A glass disk substrate having an outer diameter of 86 mm, an inner diameter of 15 mm and a thickness of 1.2 mm was used as a transparent substrate 1. Guide tracks having grooves and lands for guiding a light beam were formed directly on a surface of the substrate 1 by reactive ion etching at a track pitch of 1.6 μm with a groove width of 0.8 μm and a land width of 0.8 μm.

For formation of a dielectric layer 2, AlN was deposited to a thickness of 80 nm on the surface of the substrate 1 formed with the guide tracks. For formation of a first magnetic layer 3, TbFeCo was deposited to a thickness of 40 nm on the dielectric layer 2 by simultaneous sputtering with Tb, Fe and Co targets. For formation of a second magnetic layer 4, GdTbFeCo was deposited to a thickness of 60 nm on the first magnetic layer 3 by simultaneous sputtering with Gd, Tb, Fe and Co targets. For formation of a third magnetic layer 5, TbFeAl was deposited to a thickness of 20 nm on the second magnetic layer 4 by simultaneous sputtering with Tb, Fe and Al targets. For formation of a fourth magnetic layer 6, GdTbFeCo was deposited to a thickness of 60 nm on the third magnetic layer 5 by simultaneous sputtering with Gd, Tb, Fe and Co targets. For formation of a protective layer 7, AlN was deposited to a thickness of 20 nm on the fourth magnetic layer 6.

The sputtering for the formation of the first to fourth magnetic layers was performed at an ultimate vacuum level of not higher than $2.0 \times 10^2$ Pa at an Ar gas pressure of $6.5 \times 10^{-1}$ Pa at a discharge power of 300 W. The sputtering for the formation of the dielectric layer 2 and the protective layer 7 was performed at an ultimate vacuum level of not higher than $2.0 \times 10^{-4}$ Pa at an $N_2$ gas pressure of $3.0 \times 10^{-1}$ Pa at a discharge power of 800 W.

Further, an acrylate UV curing resin was coated on the protective layer 7 and cured by ultraviolet radiation for formation of an overcoat film.

Figure 2:
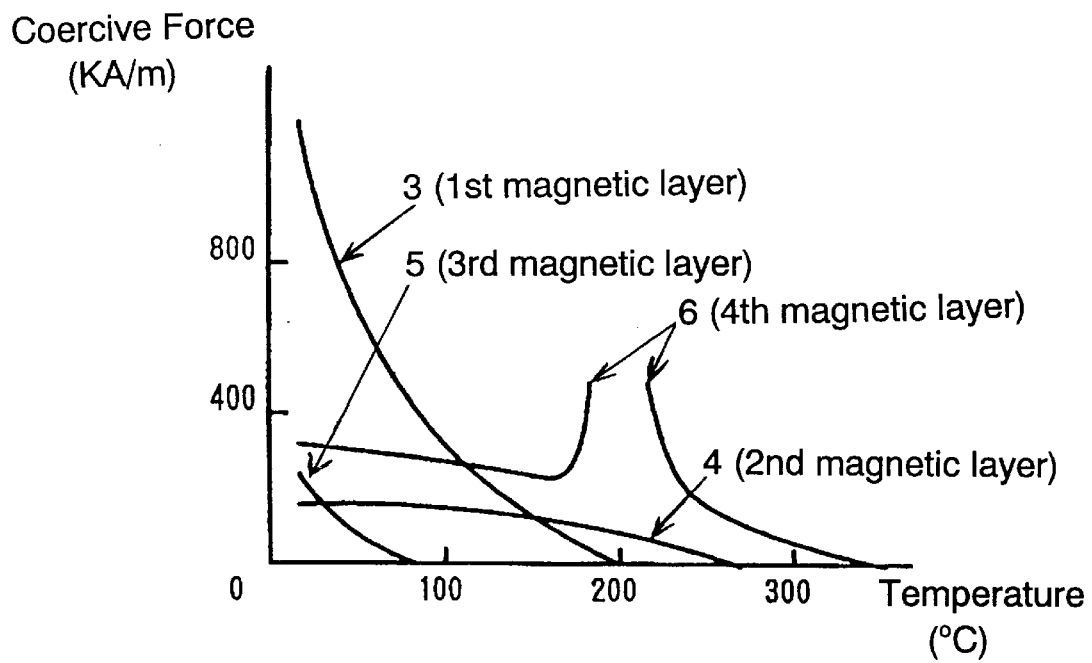
FIG. 2 is a graphical representation showing the temperature dependence of the coercive forces of first to fourth magnetic layers in the magneto-optical recording medium according to the first embodiment.

The first magnetic layer 3 had a composition of $Tb_{0.20}(Fe_{0.85}Co_{0.15})_{0.80}$, exhibited the TM rich characteristics, and had a Curie point Tc1 of 200° C. and a coercive force Hc1 of 1,200 kA/m at room temperature, as shown in FIG. 2.

The second magnetic layer 4 had a composition of $(Gd_{0.20}Tb_{0.80})_{0.32}(Fe_{0.65}Co_{0.35})_{0.68}$, exhibited the RE rich characteristics, and had a Curie point Tc2 of 250° C. and a coercive force Hc2 of 160 kA/m at room temperature, as shown in FIG. 2.

The third magnetic layer 5 had a composition of $(Tb_{0.19}Fe_{0.81})_{0.80}Al_{0.20}$, exhibited the TM rich characteristics, and had a Curie point Tc3 of 90° C. and a coercive force Hc3 of 240 kA/m at room temperature, as shown in FIG. 2.

The fourth magnetic layer 6 had a composition of $(Gd_{0.30}Tb_{0.70})_{0.28}(Fe_{0.60}Co_{0.40})$, exhibited the RE rich characteristics, and had a Curie point Tc4 of 350° C., a compensation point Tcomp4 of higher than 150° C., a coercive force Hc4 of 360 kA/m at room temperature, as shown in FIG. 2.

In other words, the first magnetic layer 3 had a lower Curie point Tc1 than the second magnetic layer 4 with a larger coercive force Hc1 at room temperature, and exhibited a perpendicular magnetic anisotropy in a temperature range from room temperature to its Curie point Tc1. The first magnetic layer 3 had a composition suitable for exhibiting the TM rich characteristics at room temperature.

The second magnetic layer 4 had a higher Curie point Tc2 than the Curie point Tc1 of the first magnetic layer 3, and exhibited a perpendicular magnetic anisotropy in a temperature range from room temperature to its Curie point Tc2. The second magnetic layer 4 had a composition suitable for exhibiting the RE rich characteristics at room temperature, and had no compensation point within a temperature range between room temperature and its Curie point Tc2.

The third magnetic layer 5 had the lowest Curie point Tc3 among the first to fourth magnetic layers, and exhibited a perpendicular magnetic anisotropy in a temperature range from room temperature to its Curie point Tc3. The third magnetic layer 5 had a composition suitable for exhibiting the TM rich characteristics at room temperature.

The fourth magnetic layer 6 had a higher Curie point Tc4 than the Curie point Tc2 of the second magnetic layer 4, and exhibited a perpendicular magnetic anisotropy in a temperature range from room temperature to its Curie point Tc4. The fourth magnetic layer 6 had a composition suitable for exhibiting the RE rich characteristics at room temperature, and had its compensation point between room temperature and its Curie point Tc4, particularly near the Curie point Tc1 of the first magnetic layer 3.

Data were recorded on the magnetic-optical disk under the following conditions: Ph (power of a high power laser beam)=10 mW; Pl (power of a low power laser beam)=3 mW; Pr (power of a reproduction laser beam)=1 mW; and record bit length=0.64 $\mu$m. As a result, perfect light modulation overwriting was achieved on the magneto-optical disk with no unerased data. The magneto-optical disk had a carrier to noise ratio (C/N) of 45 dB.

The data recording on the magneto-optical recording medium will be described with reference to FIG. 3 which illustrates the magnetization states of the first magnetic layer 3, the second magnetic layer 4, the third magnetic layer 5 and the fourth magnetic layer 6 with the temperature plotted as the abscissa. Since the magnetic layers are each composed of a rare earth—transition metal alloy, the magnetization of each magnetic layer may be represented by the sublattice magnetic moment of the rare earth metal, the sublattice magnetic moment of the transition metal, or a total magnetic moment which is a vector sum of these sublattice magnetic moments. The arrows in FIG. 3 each indicate the direction of the sublattice magnetic moment of the transition metal in a magnetic layer.

In the light modulation overwriting process on the recording medium, data is recorded thereon by modulating the intensity of a laser beam depending on the data. More specifically, the light modulation overwriting process for the data rewriting is achieved by repeating a high process in which a site on the recording medium is irradiated with a high power light beam so as to be heated to a temperature near the Curie point Tc2 and a low process in which a site on the recording medium is irradiated with a low power light beam so as to be heated to a temperature near the Curie point Tc1. The light modulation overwriting process will hereinafter be described in greater detail.

Figure 3:
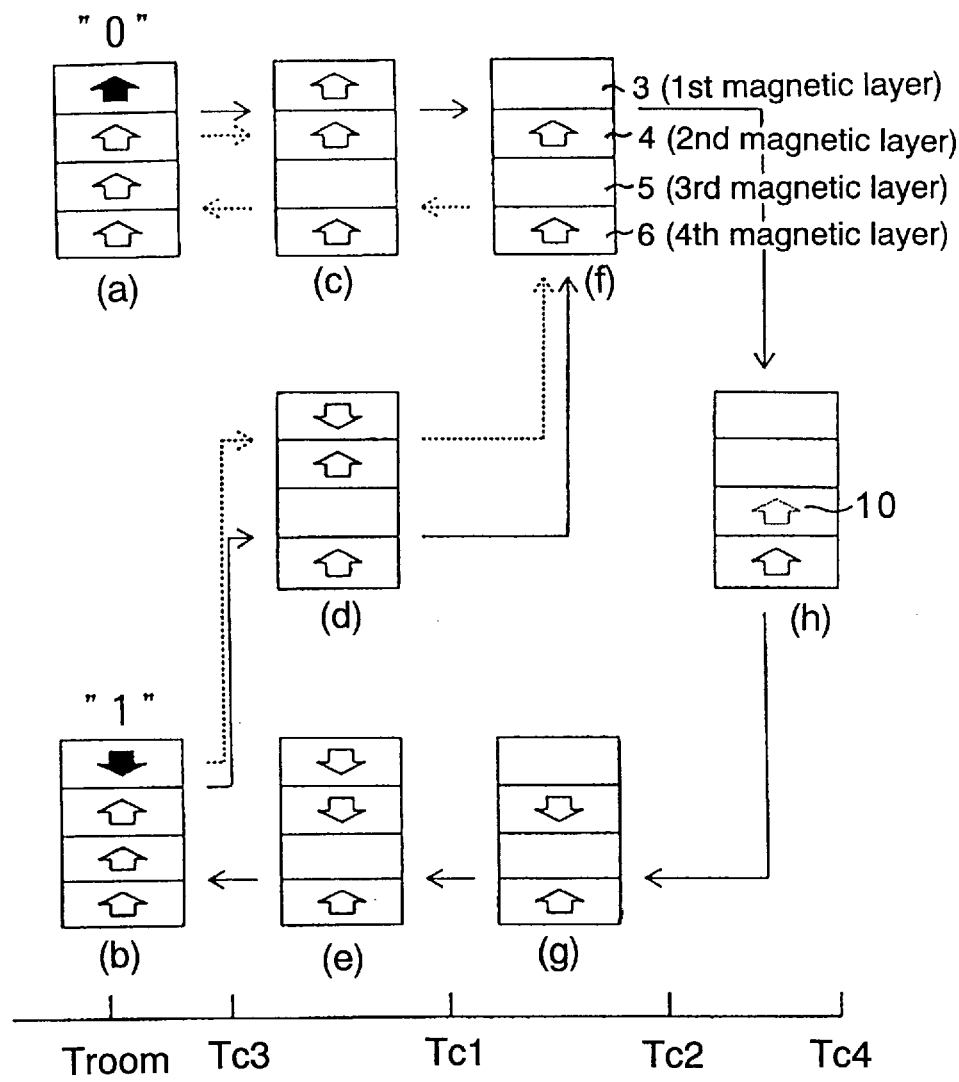
FIG. 3 is a diagram illustrating the magnetization states of the first to fourth magnetic layers for explanation of a data recording process for the magneto-optical recording medium according to the first embodiment.

At room temperature, the first magnetic layer 3 assumes either of two stable states, i.e., an upwardly magnetized state with a logic value of 0 (as indicated at (a) in FIG. 3) and a downwardly magnetized state with a logic value of 1 (as indicated at (b) in FIG. 3), depending on the direction of the sublattice magnetic moment in the first magnetic layer 3.

The high process will first be explained.

When a site on the magneto-optical recording medium is irradiated with a high power (Ph) laser beam, the irradiated site is heated up to a temperature near Tc2, and the state thereof is changed as indicated at (c) or (d) and (f) in FIG. 3. Thus, the coercive forces of the first magnetic layer 3 and the third magnetic layer 5 become zero, and the coercive force of the second magnetic layer 4 becomes very small (as indicated at (h) in FIG. 3).

In the magneto-optical recording medium according to this embodiment, the second magnetic layer 4 exhibits the RE rich characteristics and, therefore, the sublattice magnetization of the second magnetic layer 4 is directed downward by a stray magnetic field 10 (directed upward in FIG. 3) from the fourth magnetic layer 6 (as indicated as (g) in FIG. 3). In order to control the direction of the magnetization of the second magnetic layer 4 by the stray magnetic field 10, i.e., to reverse the magnetization of the second magnetic layer 4 by the stray magnetic field 10, it is desirable to maximize the strength of the stray magnetic field 10. To this end, it is desired that the total magnetic moment in the fourth magnetic layer 6 (the vector sum of the sublattice magnetic moment of the transition metal and the sublattice magnetic moment of the rear earth metal) is maximized at a temperature near the Curie point Tc2 of the second magnetic layer 4 within a temperature range between the compensation point Tcomp4 and Curie point Tc4 of the fourth magnetic layer 6. Further, the coercive force of the second magnetic layer 4 should be controlled to be smaller than the strength of the stray magnetic field 10. It is noted that the generation of the stray magnetic field 10 from the fourth magnetic layer 6 is attributable to provision of grooves on the magneto-optical disk.

When the site irradiated with the laser beam is cooled to a temperature below Tc1 as the magneto-optical disk is rotated, the magnetization of the first magnetic layer 3 occurs. The sublattice magnetization of the first magnetic layer 3 is directed downward, i.e., in the same direction as the sublattice magnetization of the second magnetic layer 4 due to interface exchange coupling, so that the first magnetic layer 3 holds a logic value of 1 (as indicated at (e) in FIG. 3).

As the site is further cooled to room temperature, the magnetization of the third magnetic layer 5 occurs, and the sublattice magnetization of the second magnetic layer 4 is directed upward, i.e., in the same direction as the sublattice magnetization of the fourth magnetic layer 6 due to interface exchange coupling (as indicated at (b) in FIG. 3). Since the conditions of the respective magnetic layers 3 to 6 (the coercive forces and thicknesses of the respective magnetic layers and interface magnetic wall energies between the respective magnetic layers) are arranged such that the magnetization state of the second magnetic layer 4 is not copied to the first magnetic layer 3 at a temperature not higher than the first temperature which is defined as a temperature between room temperature and Tc1, the magnetization of the first magnetic layer 3 is not reversed.

Thus, the first magnetic layer 3 can be magnetized downward to hold a logic value of 1 in the high process.

Next, an explanation will be given to the low process.

When a site on the magneto-optical recording medium is irradiated with a low power (P1) laser beam, the irradiated site is heated up to a temperature near Tc1. At this time, the coercive force of the third magnetic layer 5 becomes zero, and the coercive force of the first magnetic layer 3 becomes very small. However, the coercive force of the second magnetic layer 4 is significantly larger than the strength of the stray magnetic field from the fourth magnetic layer 6 and, therefore, the sublattice magnetization of the second magnetic layer 4 is still directed upward (as indicated at (f) in FIG. 3).

When the site irradiated with the laser beam is cooled as the magneto-optical disk is rotated, the magnetization of the first magnetic layer 3 occurs. The sublattice magnetization of the first magnetic layer 3 is directed upward, i.e., in the same direction as the sublattice magnetization of the second magnetic layer 4 due to interface exchange coupling, so that the first magnetic layer 3 holds a logic value of 0 (as indicated at (c) in FIG. 3).

As the site is further cooled to room temperature, the magnetization of the third magnetic layer 5 occurs, and the sublattice magnetization of the third magnetic layer 5 is directed upward, i.e., in the same direction as the sublattice magnetization of the fourth magnetic layer 6 due to interface exchange coupling (as indicated at (a) in FIG. 3).

Thus, the first magnetic layer 3 can be magnetized upward to hold a logic value of 1 in the low process.

Since the second magnetic layer 4 in the magnetic-optical recording medium of the present invention is designed such that the magnetization direction thereof can be controlled by the magnetic field from the fourth magnetic layer 6 at a temperature higher than the Curie point Tc1 of the first magnetic layer 3, the light modulation overwriting is achieved through the high process and the low process.

The data reproduction is achieved by irradiating the magneto-optical recording medium with a reproduction power (Pr) laser beam and detecting the rotation of the plane of polarization of the laser beam reflected therefrom. It is noted that the recorded data is not erased by the application of the reproduction power (Pr) which is significantly lower than the low power (P1) and produces less heat.

SECOND EMBODIMENT

Figure 5:
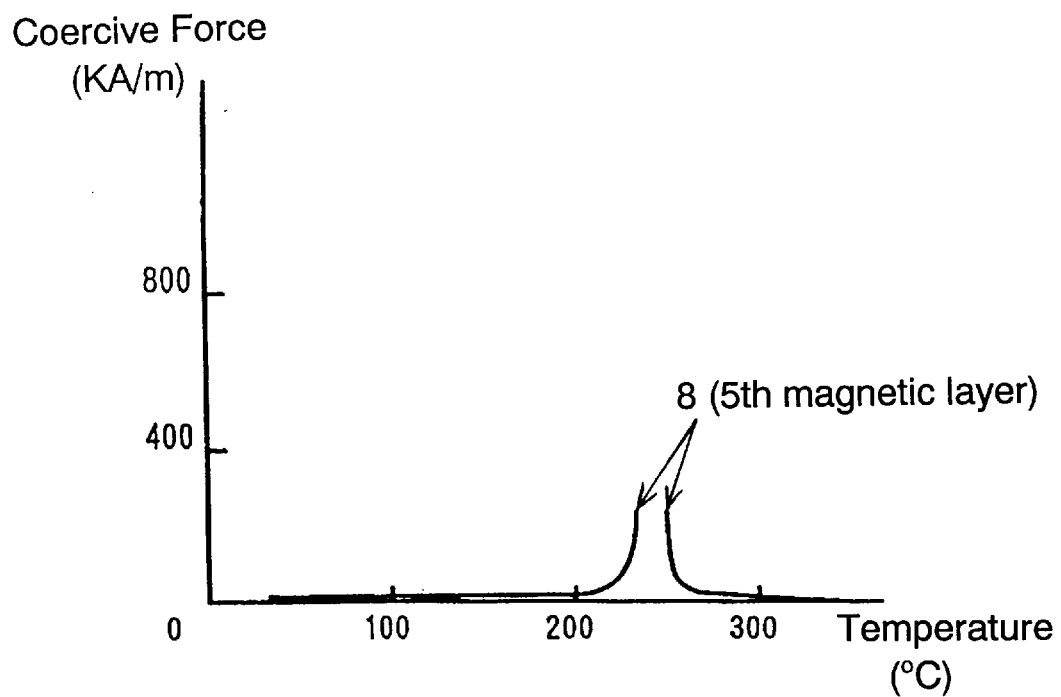
FIG. 5 is a graphical representation showing the temperature dependence of the coercive force of a fifth magnetic layer in the magneto-optical recording medium according to the second embodiment.
Figure 6:
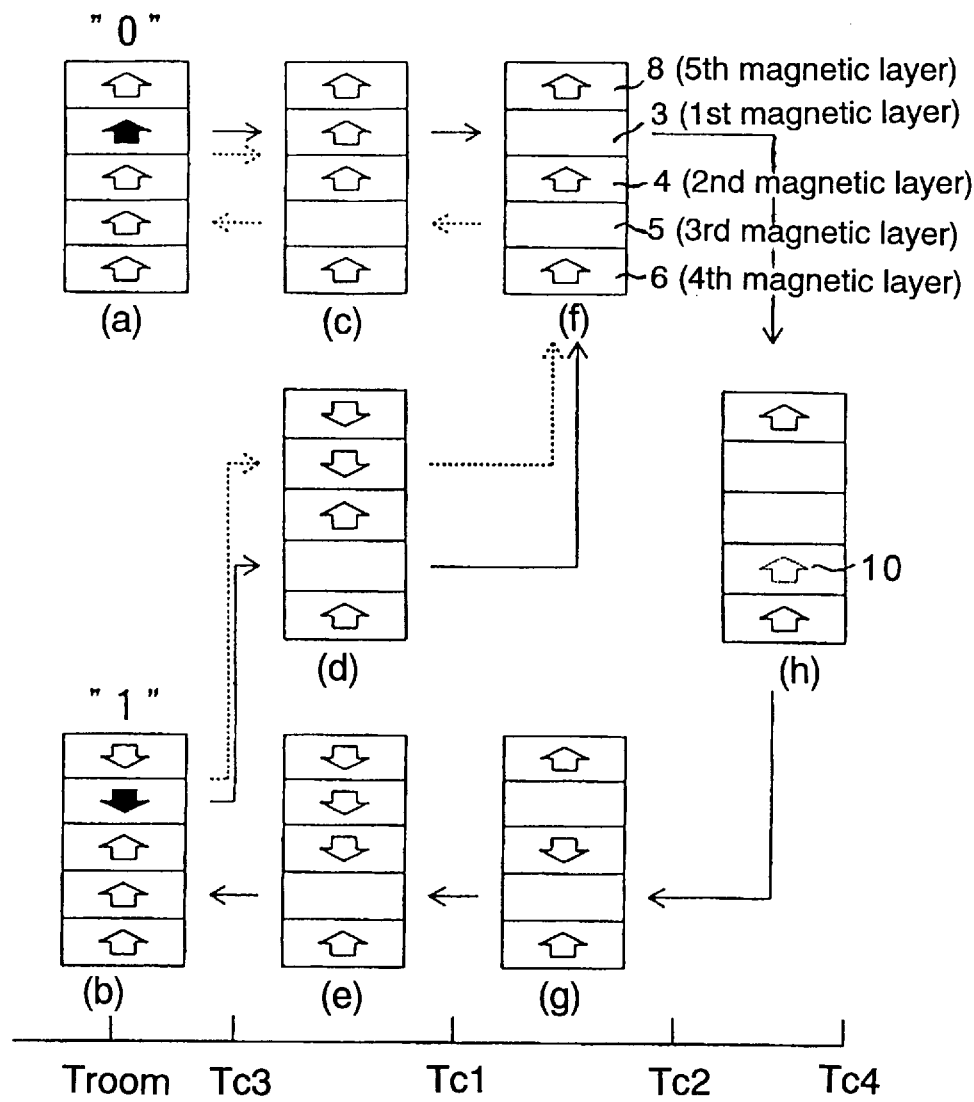
FIG. 6 is a diagram illustrating the magnetization states of first to fifth magnetic layers for explanation of a data recording process for the magneto-optical recording medium according to the second embodiment.

A second embodiment of the present invention will be described with reference to FIGS. 4 to 6.

Figure 4:
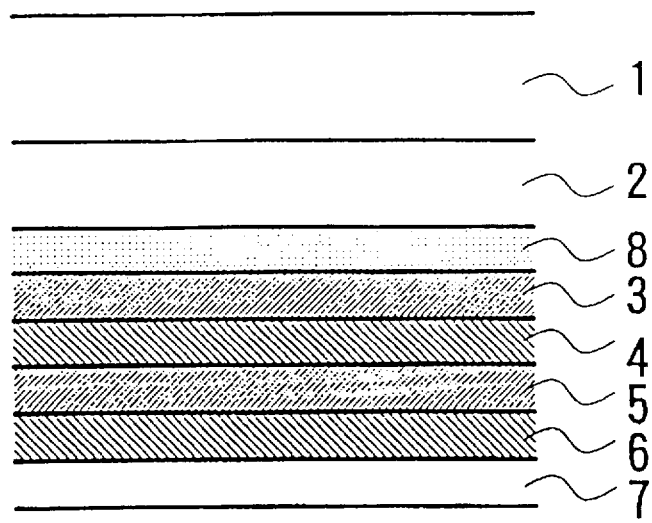
FIG. 4 is a schematic sectional view illustrating the construction of a magneto-optical recording medium according to a second embodiment of the present invention.

The second embodiment is different from the first embodiment in that a magneto-optical recording medium has a fifth magnetic layer 8 provided between the dielectric layer 2 and the first magnetic layer 3 as shown in FIG. 4.

A magneto-optical disk as one example of the magneto-optical recording medium is shown below.

The magneto-optical disk of the second embodiment has substantially the same construction as that of the first embodiment except that a 30-nm thick fifth magnetic layer 8 is provided between the dielectric layer 2 and the first magnetic layer 3.

The magneto-optical disk was fabricated in substantially the same manner as in the first embodiment. The fifth magnetic layer 8 had a composition of $Gd_{0.27}(Fe_{0.70}Co_{0.30})_{0.73}$, exhibited the RE rich characteristics, and had a Curie point Tc5 of higher than 300° C. and a compensation point of higher than 200° C., as shown in FIG. 5.

In other words, the fifth magnetic layer 8 had a higher Curie point Tc5 than that of the first magnetic layer 3, and exhibited a perpendicular magnetic anisotropy in a temperature range from room temperature to its Curie point Tc5.

Perfect light modulation overwriting was achieved on this magneto-optical disk with no uneraced data. The magneto-optical disk had a carrier to noise (C/N) ratio of 46.5 dB. The magneto-optical disk of the second embodiment had an improved signal quality in comparison with the magneto-optical disk of the first embodiment which had a C/N ratio of 45 dB. This is supposedly because the Curie point Tc5 of the fifth magnetic layer 8 was higher than the Curie point Tc1 of the first magnetic layer 3 so that the Kerr rotation angle was increased.

A data recording process according to the second embodiment will be described with reference to FIG. 6, which illustrates the magnetization states of the fifth magnetic layer 8, the first magnetic layer 3, the second magnetic layer 4, the third magnetic layer 5 and the fourth magnetic layer 6 with the temperature plotted as the abscissa. Since the magnetic layers are each composed of a rare earth—transition metal alloy, the magnetization of each magnetic layer may be represented by the sublattice magnetic moment of the rare earth metal, the sublattice magnetic moment of the transition metal, or a total magnetic moment which is a vector sum of these sublattice magnetic moments. The arrows in FIG. 6 each indicate the direction of the sublattice magnetic moment of the transition metal in a magnetic layer.

The magnetization states of the first magnetic layer 3, the second magnetic layer 4, the third magnetic layer 5 and the fourth magnetic layer 6 in the data recording process according to the second embodiment are the same as in the data recording process according to the first embodiment described with reference to FIG. 3. Therefore, an explanation thereto is herein dispensed with.

The fifth magnetic layer 8 assumes the same magnetization state as the first magnetic layer 3 at a temperature lower than the Curie point Tc1 of the first magnetic layer 3. When the magneto-optical disk is heated up to a temperature not lower than the Curie point Tc1, the first magnetic layer 3 is demagnetized, but the fifth magnetic layer 8 still assumes the same magnetization state as before the heating. Since the data reproduction is performed at a temperature lower than the Curie point Tc1 of the first magnetic layer 3, data is reproduced from the fifth magnetic layer 8 which holds the same data as recorded in the first magnetic layer 3.

THIRD EMBODIMENT

Figure 8:
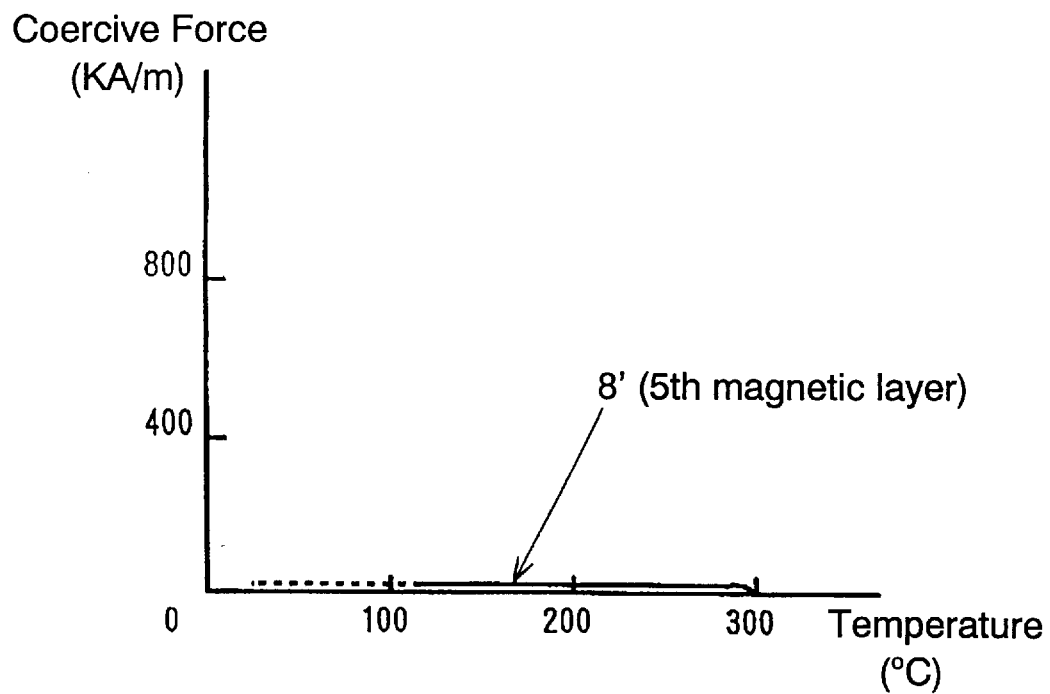
FIG. 8 is a graphical representation showing the temperature dependence of the coercive force of a fifth magnetic layer in the magneto-optical recording medium according to the third embodiment.
Figure 9:
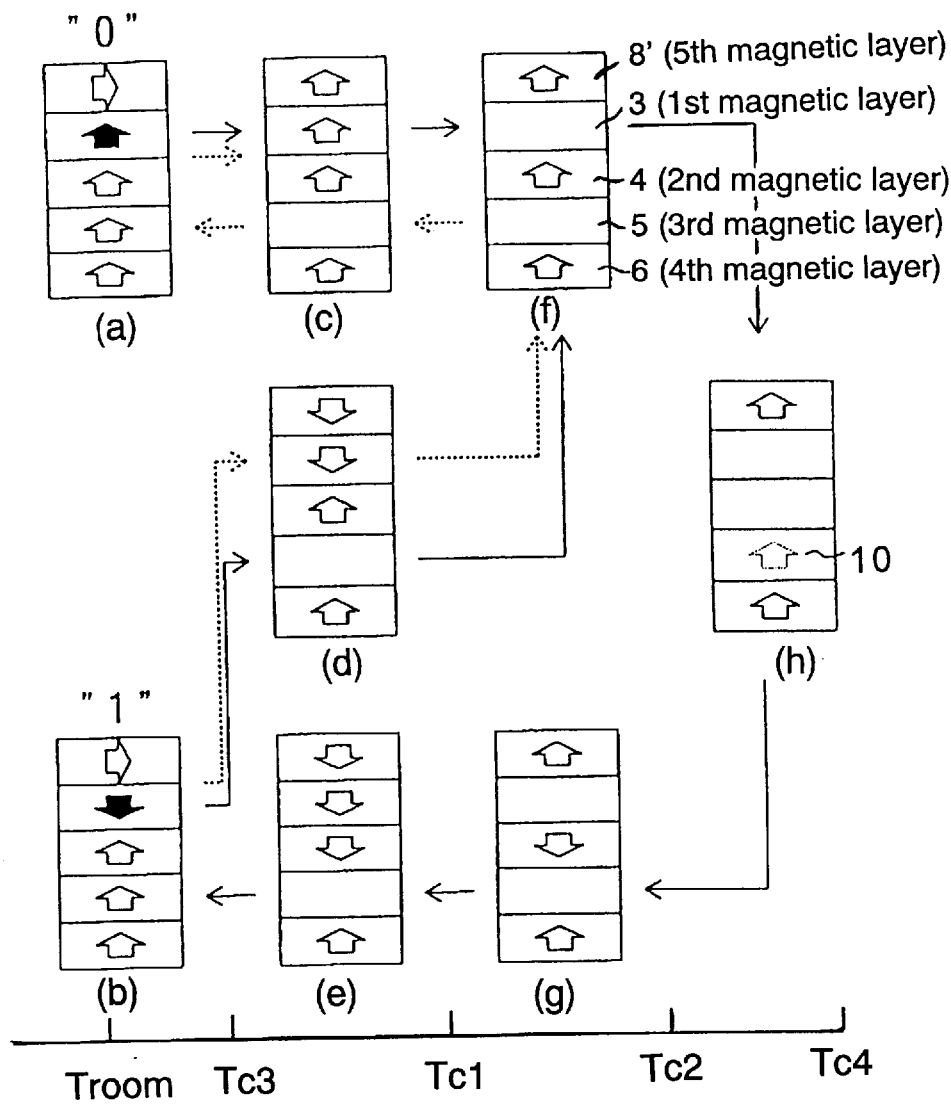
FIG. 9 is a diagram illustrating the magnetization states of first to fifth magnetic layers for explanation of a data recording process for the magneto-optical recording medium according to the third embodiment.

A third embodiment of the present invention will be described with reference to FIGS. 7 to 9.

Figure 7:
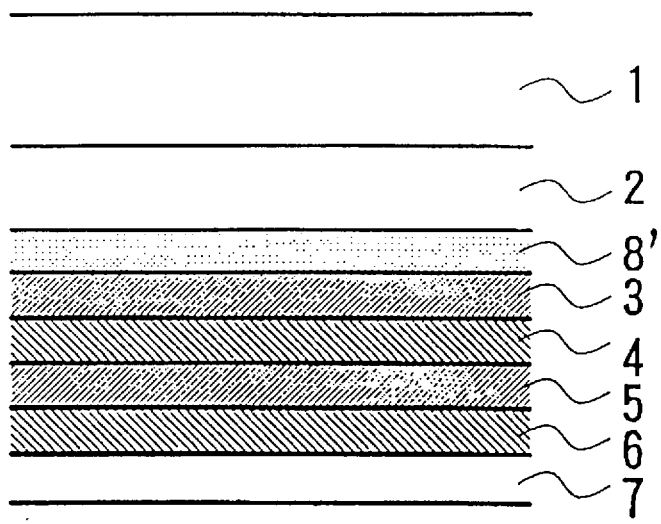
FIG. 7 is a schematic sectional view illustrating the construction of a magneto-optical recording medium according to a third embodiment of the present invention.

The third embodiment is different from the first embodiment in that a magneto-optical recording medium has a fifth magnetic layer 8' provided between the dielectric layer 2 and the first magnetic layer 3 as shown in FIG. 7.

A magneto-optical disk as one example of the magneto-optical recording medium is shown below.

The magneto-optical disk of the third embodiment has substantially the same construction as that of the first embodiment except that a 30-nm thick fifth magnetic layer 8' is provided between the dielectric layer 2 and the first magnetic layer 3.

The magneto-optical disk was fabricated in substantially the same manner as in the first embodiment. The fifth magnetic layer 8' had a composition of $Gd_{0.29}(Fe_{0.80}Co_{0.20})_{0.71}$, exhibited the RE rich characteristics, and had a Curie point Tc5' of 300° C. and no compensation point. The fifth magnetic layer 8' exhibited a perpendicular magnetic anisotropy at about 120° C., as shown in FIG. 8.

In other words, the fifth magnetic layer 8' had a higher Curie point Tc5' than the first magnetic layer 3 and a coercive force Hc5' of substantially zero at room temperature. The fifth magnetic layer 8' exhibited an in-plane magnetic anisotropy at room temperature, and a perpendicular magnetic anisotropy at a temperature not lower than a predetermined temperature (second temperature) which is defined as a temperature below the Curie temperature Tc1 of the first magnetic layer 3.

Perfect light modulation overwriting was achieved on this magneto-optical disk with no uneraced data. The magneto-optical disk had a carrier to noise (C/N) ratio of 46.5 dB. The magneto-optical disk of the third embodiment had an improved signal quality in comparison with the magneto-optical disk of the first embodiment which had a C/N ratio of 45 dB. This is supposedly because the Curie point Tc5' of the fifth magnetic layer 8' was higher than the Curie point Tc1 of the first magnetic layer 3 so that the Kerr rotation angle was increased.

A data recording process according to the third embodiment will be described with reference to FIG. 9, which illustrates the magnetization states of the fifth magnetic layer 8', the first magnetic layer 3, the second magnetic layer 4, the third magnetic layer 5 and the fourth magnetic layer 6 with the temperature plotted as the abscissa. Since the magnetic layers are each composed of a rare earth—transition metal alloy, the magnetization of each magnetic layer may be represented by the sublattice magnetic moment of the rare earth metal, the sublattice magnetic moment of the transition metal, or a total magnetic moment which is a vector sum of these sublattice magnetic moments. The arrows in FIG. 9 each indicate the direction of the sublattice magnetization of the transition metal in a magnetic layer.

The magnetization states of the first magnetic layer 3, the second magnetic layer 4, the third magnetic layer 5 and the fourth magnetic layer 6 in the data recording process according to the third embodiment are the same as in the data recording process according to the first embodiment described with reference to FIG. 3. Therefore, an explanation thereto is herein dispensed with.

The fifth magnetic layer 8' exhibits an in-plane magnetic anisotropy at room temperature and a perpendicular magnetic anisotropy at a temperature not lower than the second temperature. Therefore, the fifth magnetic layer 8' assumes the same magnetization state as the first magnetic layer 3 in a temperature range between room temperature and the second temperature. Since the data reproduction is performed at a temperature not lower than the second temperature and lower than the Curie point Tc1 of the first magnetic layer 3, data is reproduced from the fifth magnetic layer 8' which holds the same data as recorded in the first magnetic layer 3.

With a small record bit length, the S/N ratio of the magneto-optical disk of the third embodiment was not reduced so much, while the S/N ratio of the magneto-optical disk of the first embodiment was remarkably reduced. This is supposedly because the fifth magnetic layer 8' exhibited an in-plane magnetic anisotropy at room temperature and, when irradiated with the reproduction power laser beam, exhibited a perpendicular magnetic anisotropy. Even with a small record bit length, the data reproduction was not influenced by an adjacent record bit.

FOURTH EMBODIMENT

A fourth embodiment of the present invention will be described with reference to FIGS. 10 to 12.

Figure 10:
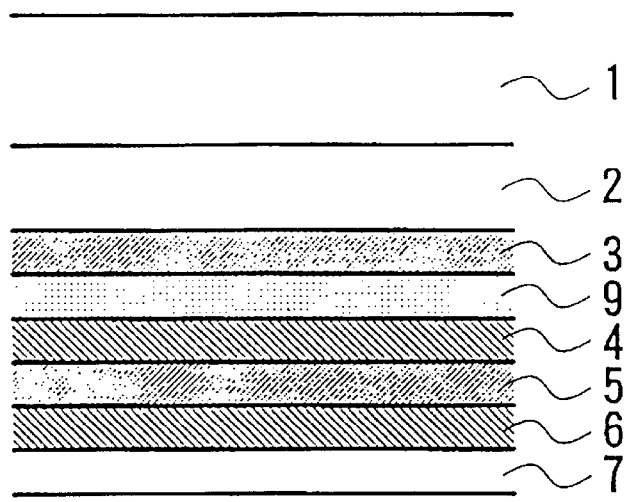
FIG. 10 is a schematic sectional view illustrating the construction of a magneto-optical recording medium according to a fourth embodiment of the present invention.

The fourth embodiment is different from the first embodiment in that a magneto-optical recording medium has a sixth magnetic layer 9 provided between the first magnetic layer 3 and the second magnetic layer 4 as shown in FIG. 10.

A magneto-optical disk as one example of the magneto-optical recording medium is shown below.

The magneto-optical disk of the fourth embodiment has substantially the same construction as that of the first embodiment except that a 40-nm thick sixth magnetic layer 9 is provided between the first magnetic layer 3 and the second magnetic layer 4.

The magneto-optical disk was fabricated in substantially the same manner as in the first embodiment. The sixth magnetic layer 9 had a composition of $Gd_{0.30}(Fe_{0.70}Co_{0.30})_{0.70}$, exhibited the RE rich characteristics, and had a Curie point Tc6 of higher than 300° C.

Figure 11:
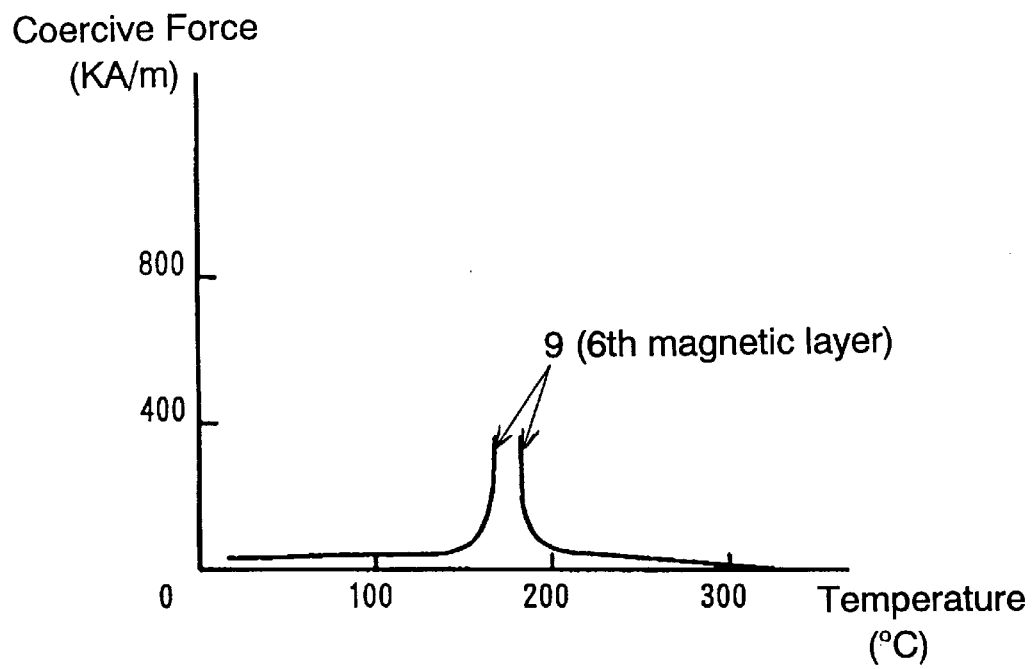
FIG. 11 is a graphical representation showing the temperature dependence of the coercive force of a sixth magnetic layer in the magneto-optical recording medium according to the fourth embodiment.
Figure 12:
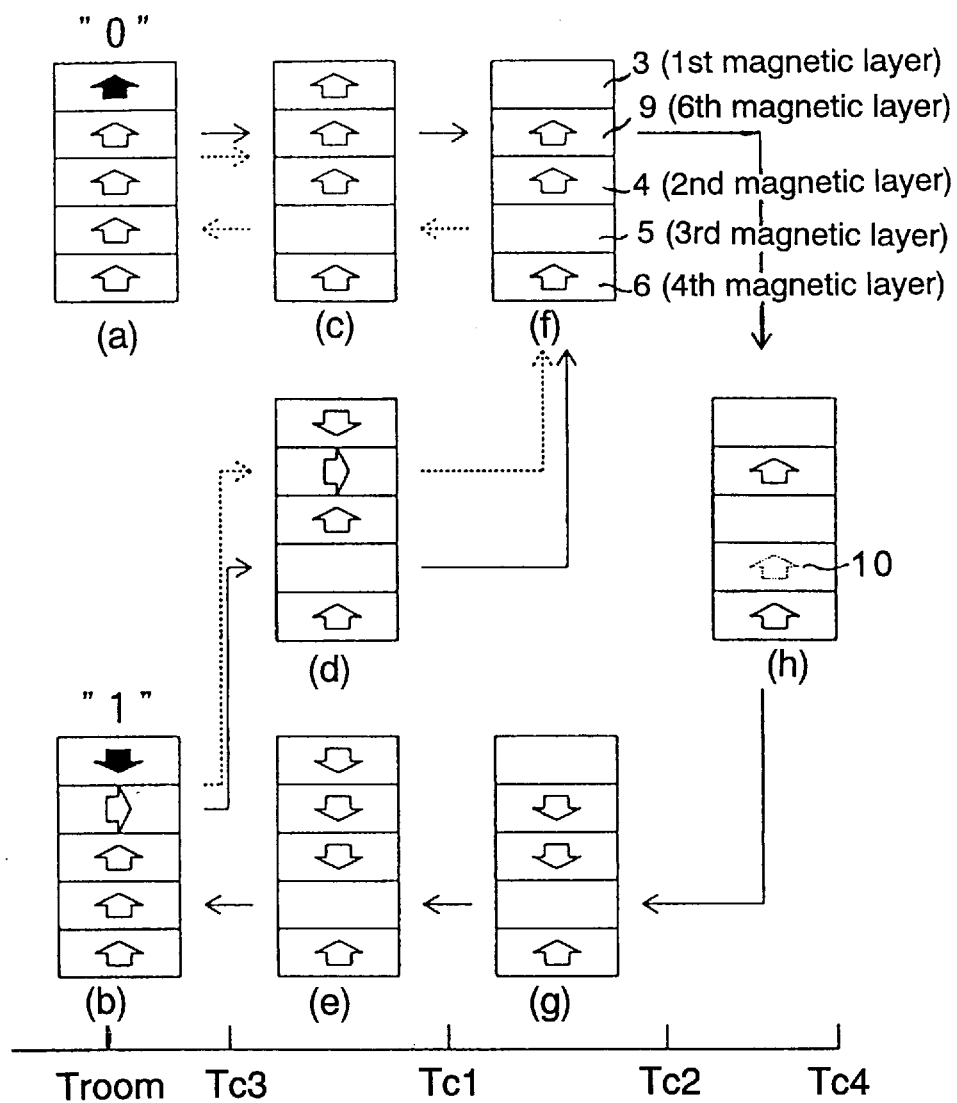
FIG. 12 is a diagram illustrating the magnetization states of first to fourth and sixth magnetic layers for explanation of a data recording process for the magneto-optical recording medium according to the fourth embodiment.

As shown in FIG. 11, the sixth magnetic layer 9 had a coercive force Hc6 of substantially zero at room temperature, and exhibited a slight perpendicular or in-plane magnetic anisotropy at room temperature, and a strong perpendicular magnetic anisotropy at a temperature not lower than a predetermined temperature (third temperature) which is defined as a temperature below the Curie temperature Tc1 of the first magnetic layer 3.

Data were recorded on the magnetic-optical disk under the following conditions: Ph=9 mW; P=2 mW; Pr=1 mW; and record bit length=0.64 μm. As a result, perfect light modulation overwriting was achieved on the magneto-optical disk with no uneraced data. The magneto-optical disk had a carrier to noise ratio (C/N) of 45 dB. The magneto-optical disk of the fourth embodiment had an improved recording sensitivity in comparison with the magneto-optical disk of the first embodiment which employed the recording conditions of Ph=10 mW and P1=3 mW. This is supposedly because the provision of the sixth magnetic layer 9 between the first magnetic layer 3 and the second magnetic layer 4 facilitated the light modulation overwriting process.

A data recording process according to the fourth embodiment will be described with reference to FIG. 12, which illustrates the magnetization states of the first magnetic layer 3, the sixth magnetic layer 9, the second magnetic layer 4, the third magnetic layer 5 and the fourth magnetic layer 6 with the temperature plotted as the abscissa. Since the magnetic layers are each composed of a rare earth—transition metal alloy, the magnetization of each magnetic layer may be represented by the sublattice magnetic moment of the rare earth metal, the sublattice magnetic moment of the transition metal, or a total magnetic moment which is a vector sum of these sublattice magnetic moments. The arrows in FIG. 12 each indicate the direction of the sublattice magnetic moment of the transition metal in a magnetic layer.

The magnetization states of the first magnetic layer 3, the second magnetic layer 4, the third magnetic layer 5 and the fourth magnetic layer 6 in the data recording process according to the fourth embodiment are the same as in the data recording process according to the first embodiment described with reference to FIG. 3. Therefore, an explanation thereto is herein dispensed with. It is noted that the coercive forces and thicknesses of the first magnetic layer 3, the second magnetic layer 4, the third magnetic layer 5, the fourth magnetic layer 6 and the sixth magnetic layer 9 are adjusted so that the magnetization direction of the first magnetic layer 3 is not reversed by exchange coupling forces from the second magnetic layer 4, the third magnetic layer 5, the fourth magnetic layer 6 and the sixth magnetic layer 9 at room temperature.

Since the sixth magnetic layer 9 exhibits a slight perpendicular or in-plane magnetic anisotropy at room temperature and a strong perpendicular magnetic anisotropy at a temperature not lower than the third temperature, the copying of the magnetization state from the second magnetic layer 4 to the first magnetic layer 3 hardly occurs at room temperature but readily occurs at a temperature not lower than the third temperature. Therefore, the light modulation overwriting process is more smoothly performed than in the first embodiment.

FIFTH EMBODIMENT

Figure 14:
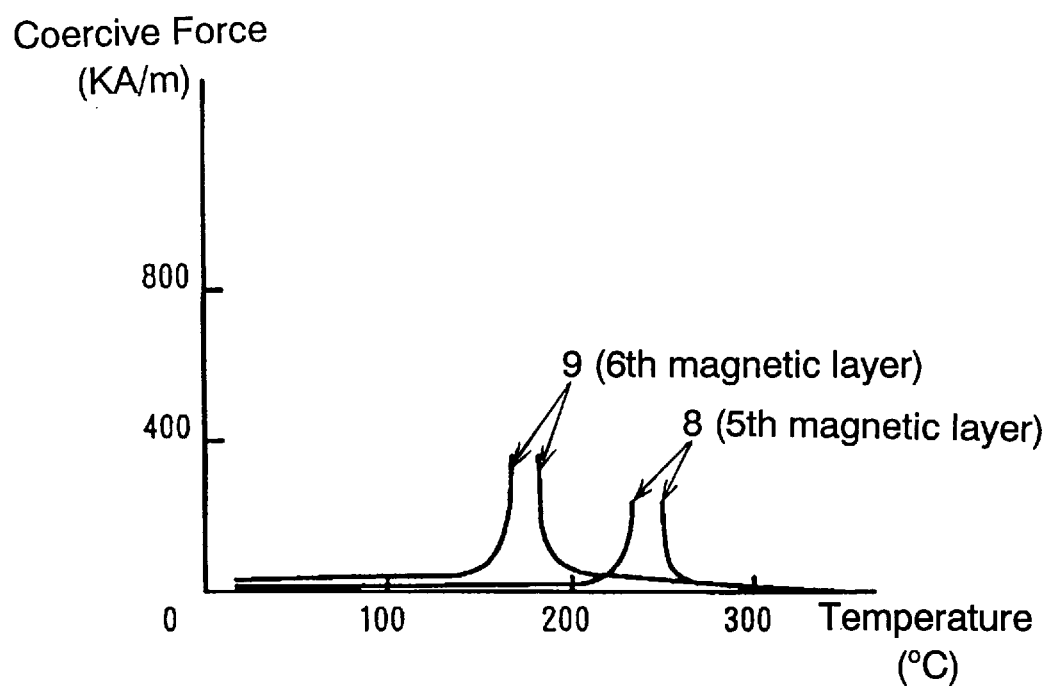
FIG. 14 is a graphical representation showing the temperature dependence of the coercive forces of fifth and sixth magnetic layers in the magneto-optical recording medium according to the fifth embodiment.
Figure 15:
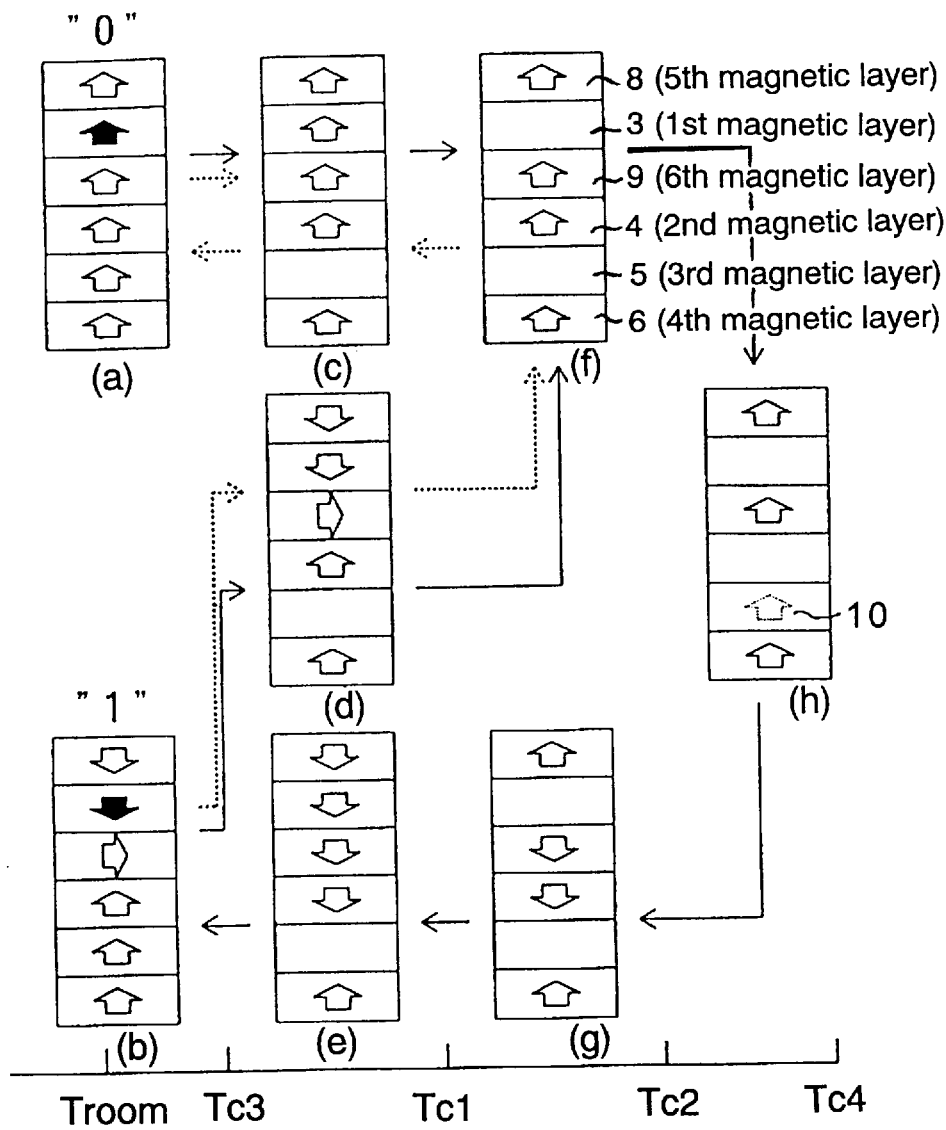
FIG. 15 is a diagram illustrating the magnetization states of first to sixth magnetic layers for explanation of a data recording process for the magneto-optical recording medium according to the fifth embodiment.

A fifth embodiment of the present invention will be described with reference to FIGS. 13 to 15. For convenience of description, like components having the same functions as in the foregoing embodiments are denoted by like reference numerals, and an explanation will not be given thereto.

Figure 13:
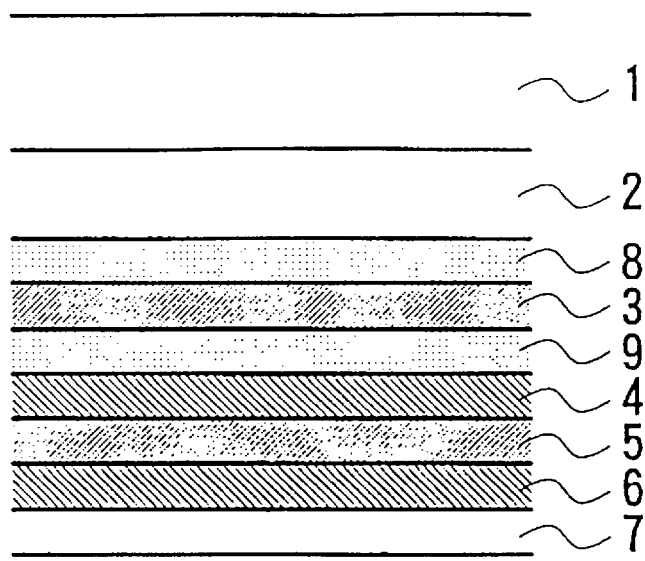
FIG. 13 is a schematic sectional view illustrating the construction of a magneto-optical recording medium according to a fifth embodiment of the present invention.

The fifth embodiment is different from the first embodiment in that a magneto-optical recording medium has a fifth magnetic layer 8 provided between the dielectric layer 2 and the first magnetic layer 3, and a sixth magnetic layer 9 provided between the first magnetic layer 3 and the second magnetic layer 4 as shown in FIG. 13.

A magneto-optical disk as one example of the magneto-optical recording medium is shown below.

The magneto-optical disk of the fifth embodiment has substantially the same construction as that of the first embodiment, except that a 30-nm thick fifth magnetic layer 8 having the same characteristics as in the second embodiment is provided between the dielectric layer 2 and the first magnetic layer 3 and a 40-nm thick sixth magnetic layer 9 having the same characteristics as in the fourth embodiment is provided between the first magnetic layer 3 and the second magnetic layer 4.

The magneto-optical disk was fabricated in substantially the same manner as in the first embodiment. As shown in FIG. 14, the fifth magnetic layer 8 had a Curie point Tc5 higher than the first magnetic layer 3 and exhibited a perpendicular magnetic anisotropy in a temperature range from room temperature to its Curie point Tc5. The sixth magnetic layer 9 had a coercive force Hc6 of substantially zero at room temperature. The sixth magnetic layer 9 exhibited a slight perpendicular or in-plane magnetic anisotropy at room temperature, and a strong perpendicular magnetic anisotropy at a temperature not lower than a predetermined temperature (third temperature) which is defined as a temperature below the Curie temperature Tc1 of the first magnetic layer 3.

Data were recorded on the magnetic-optical disk under the following conditions: Ph=9 mW; P1=2 mW; Pr=1 mW; and record bit length=0.64 µm. As a result, perfect light modulation overwriting was achieved on the magneto-optical disk with no uneraced data. The magneto-optical disk had a carrier to noise ratio (C/N) of 46.5 dB. The magneto-optical disk of the fifth embodiment had an improved recording sensitivity in comparison with the magneto-optical disk of the first embodiment which employed the recording conditions of Ph=10 mW and P1=3 mW. This is supposedly because the provision of the sixth magnetic layer 9 between the first magnetic layer 3 and the second magnetic layer 4 facilitated the light modulation overwriting process. Further, the magneto-optical disk of the fifth embodiment had an improved signal quality in comparison with the magneto-optical disk of the first embodiment which had a C/N ratio of 45 dB. This is supposedly because the provision of the fifth magnetic layer 8 having a Curie point Tc5 higher than Tc1 increased the Kerr rotation angle.

A data recording process according to the fifth embodiment will be described with reference to FIG. 15, which illustrates the magnetization states of the fifth magnetic layer 8, the first magnetic layer 3, the sixth magnetic layer 9, the second magnetic layer 4, the third magnetic layer 5 and the fourth magnetic layer 6 with the temperature plotted as the abscissa. Since the magnetic layers are each composed of a rare earth—transition metal alloy, the magnetization of each magnetic layer may be represented by the sublattice magnetic moment of the rare earth metal, the sublattice magnetic moment of the transition metal, or a total magnetic moment which is a vector sum of these sublattice magnetic moments. The arrows in FIG. 15 each indicate the direction of the sublattice magnetic moment of the transition metal in a magnetic layer.

The magnetization states of the first magnetic layer 3, the second magnetic layer 4, the third magnetic layer 5 and the fourth magnetic layer 6 in the data recording process according to the fifth embodiment are the same as in the foregoing embodiments. Therefore, an explanation thereto is herein dispensed with. Further, the fifth magnetic layer 8 assumes the same magnetization states as in the second embodiment, and the sixth magnetic layer 9 assumes the same magnetization states as in the fourth embodiment.

SIXTH EMBODIMENT

Figure 17:
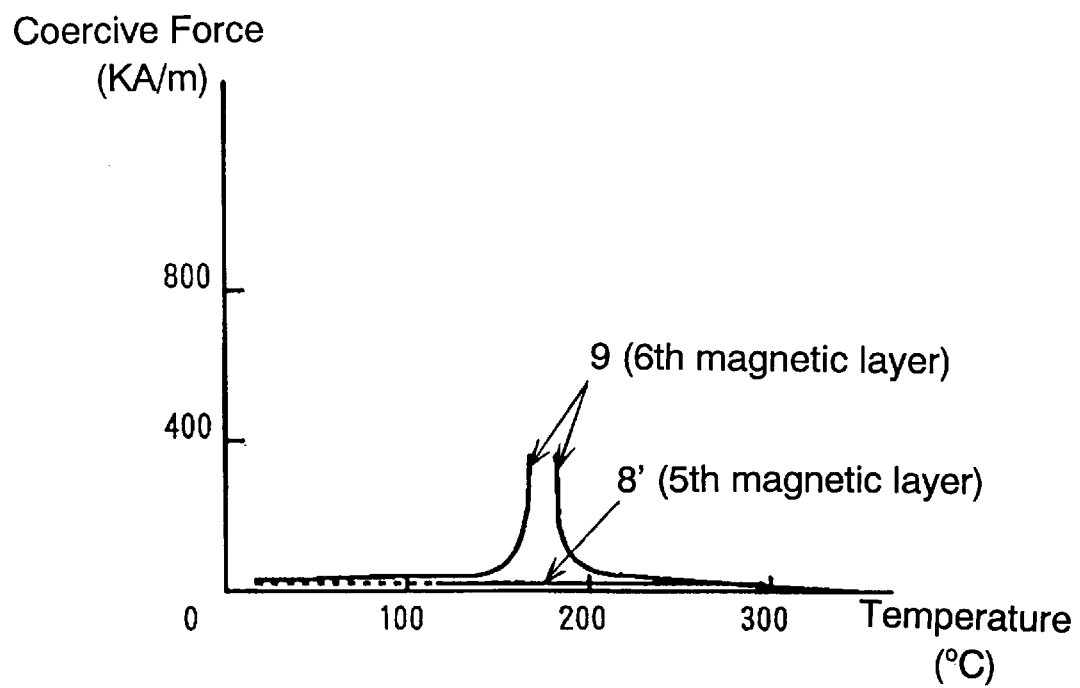
FIG. 17 is a graphical representation showing the temperature dependence of the coercive forces of fifth and sixth magnetic layers in the magneto-optical recording medium according to the sixth embodiment.
Figure 18:
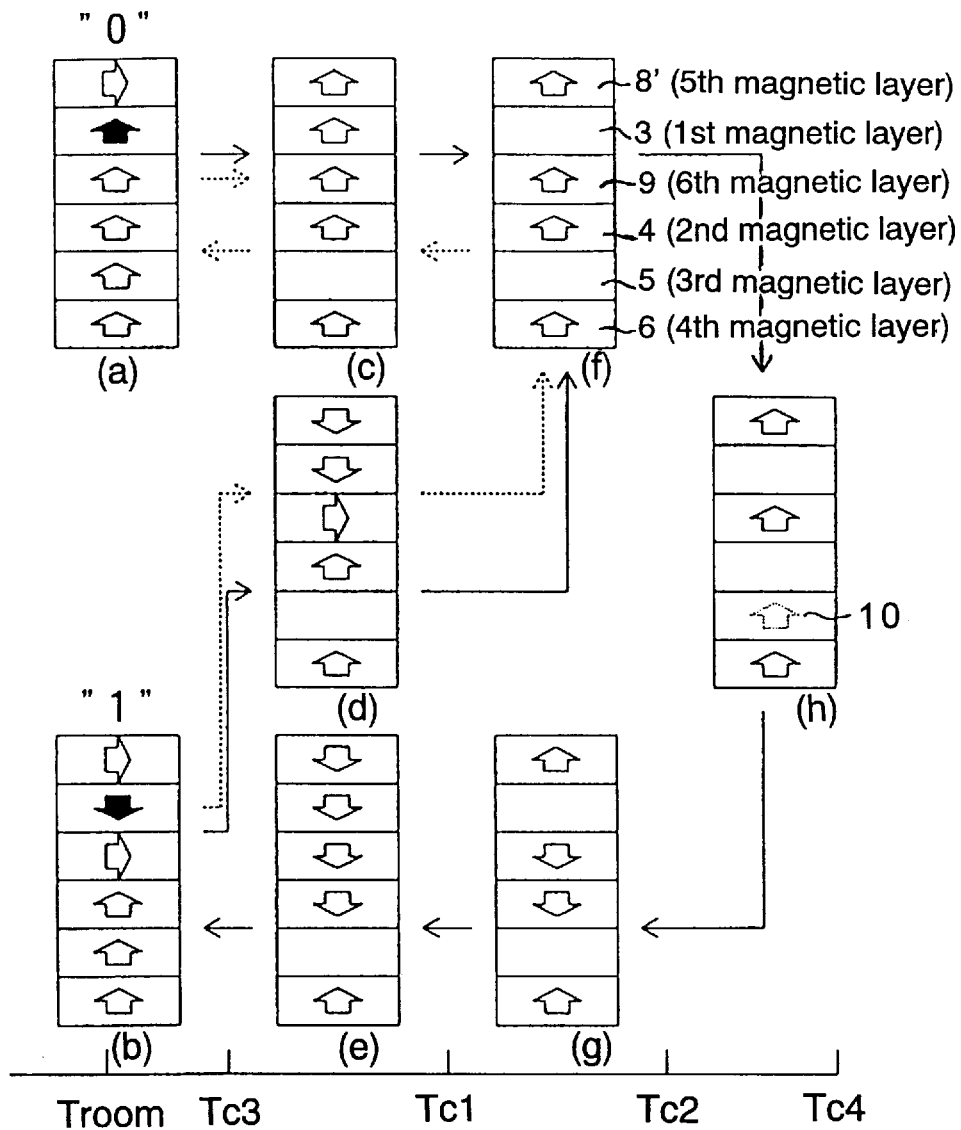
FIG. 18 is a diagram illustrating the magnetization states of first to sixth magnetic layers for explanation of a data recording process for the magneto-optical recording medium according to the sixth embodiment.
Figure 19:
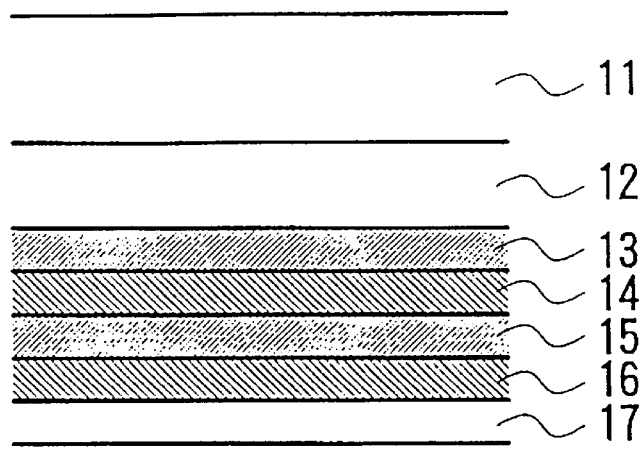
FIG. 19 is a schematic sectional view illustrating the construction of a magneto-optical recording medium according to a prior art.
Figure 20:
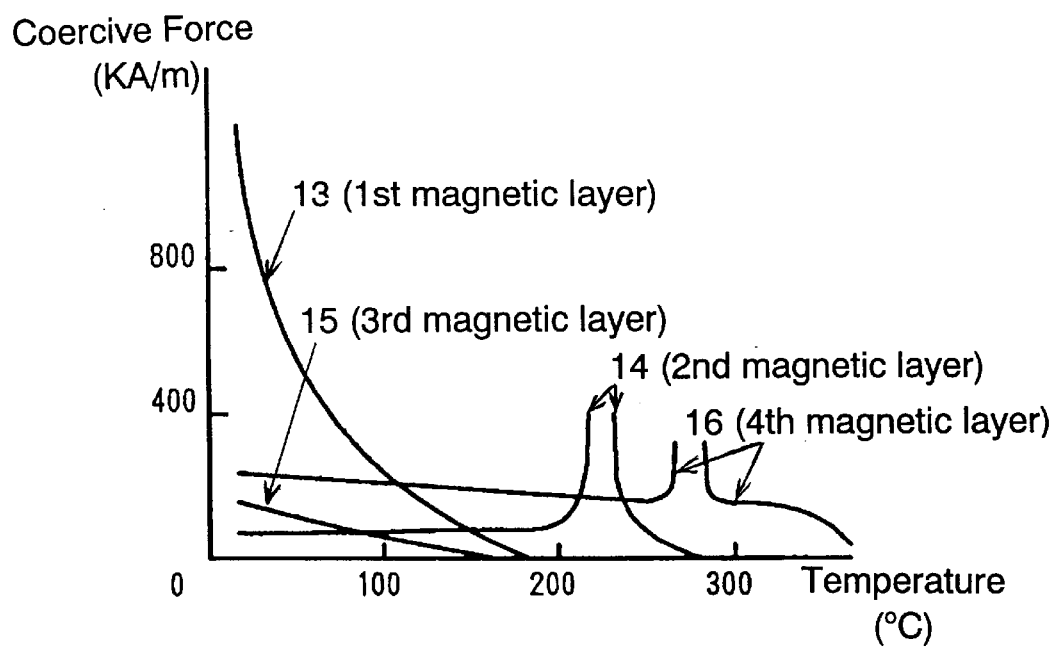
FIG. 20 is a graphical representation showing the temperature dependence of the coercive forces of first to fourth magnetic layers in the magneto-optical recording medium according to the prior art.

A sixth embodiment of the present invention will be described with reference to FIGS. 16 to 18. For convenience of description, like components having the same functions as in the foregoing embodiments are denoted by like reference numerals, and an explanation will not given thereto.

Figure 16:
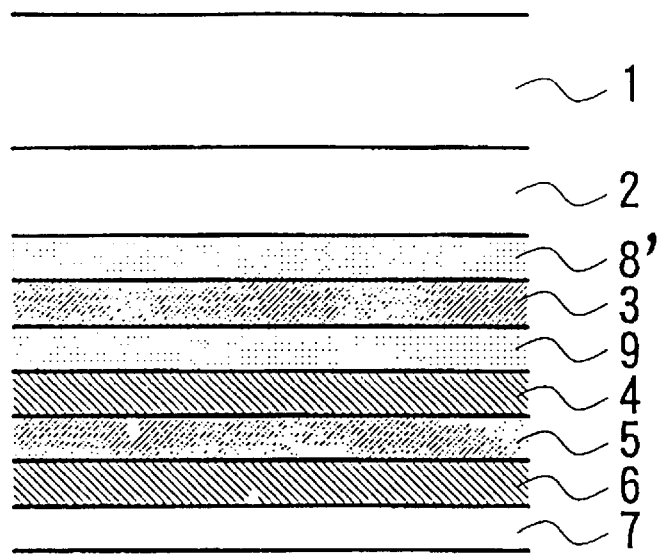
FIG. 16 is a schematic sectional view illustrating the construction of a magneto-optical recording medium according to a sixth embodiment of the present invention.

The sixth embodiment is different from the first embodiment in that a magneto-optical recording medium has a fifth magnetic layer 8' provided between the dielectric layer 2 and the first magnetic layer 3, and a sixth magnetic layer 9 provided between the first magnetic layer 3 and the second magnetic layer 4 as shown in FIG. 16.

A magneto-optical disk as one example of the magneto-optical recording medium is shown below.

The magneto-optical disk of the sixth embodiment has substantially the same construction as that of the first embodiment, except that a 30-nm thick fifth magnetic layer 8' having the same characteristics as in the third embodiment is provided between the dielectric layer 2 and the first magnetic layer 3 and a 40-nm thick sixth magnetic layer 9 having the same characteristics as in the fourth embodiment is provided between the first magnetic layer 3 and the second magnetic layer 4.

The magneto-optical disk was fabricated in substantially the same manner as in the first embodiment. As shown in FIG. 17, the fifth magnetic layer 8' had a Curie point Tc5' higher than the first magnetic layer 3 and a coercive force Hc5' of substantially zero at room temperature. The fifth magnetic layer 8' exhibited an in-plane magnetic anisotropy at room temperature and a perpendicular magnetic anisotropy at a temperature not lower than a predetermined temperature (second temperature) which is defined as a temperature below Tc1.

The sixth magnetic layer 9 had a coercive force Hc6 of substantially zero at room temperature. The sixth magnetic layer 9 exhibited a slight perpendicular or in-plane magnetic anisotropy at room temperature, and a strong perpendicular magnetic anisotropy at a temperature not lower than a predetermined temperature (third temperature) which is defined as a temperature below Tc1.

Data were recorded on the magnetic-optical disk under the following conditions: Ph=9 mW; P1=2 mW; Pr=1 mW; and record bit length=0.64 $\mu$m. As a result, perfect light modulation overwriting was achieved on the magneto-optical disk with no uneraced data. The magneto-optical disk had a carrier to noise (C/N) ratio of 46.5 dB. The magneto-optical disk of the sixth embodiment had an improved recording sensitivity in comparison with the magneto-optical disk of the first embodiment which employed the recording conditions of Ph=10 mW and P1=3 mW. This is supposedly because the provision of the sixth magnetic layer 9 between the first magnetic layer 3 and the second magnetic layer 4 facilitated the light modulation overwriting process. Further, the magneto-optical disk of the sixth embodiment had an improved signal quality in comparison with the magneto-optical disk of the first embodiment which had a C/N ratio of 45 dB. This is supposedly because the provision of the fifth magnetic layer 8' having a Curie point Tc5' higher than Tc1 increased the Kerr rotation angle.

With a small record bit length, the S/N ratio of the magneto-optical disk of the sixth embodiment was not reduced so much, while the S/N ratio of the magneto-optical disk of the first embodiment was remarkably reduced. This is supposedly because the fifth magnetic layer 8 exhibited an in-plane magnetic anisotropy at room temperature and, when irradiated with the reproduction power laser beam, exhibited a perpendicular magnetic anisotropy. Even with a small record bit length, the data reproduction was not influenced by an adjacent record bit.

A data recording process according to the sixth embodiment will be described with reference to FIG. 18, which illustrates the magnetization states of the fifth magnetic layer 8', the first magnetic layer 3, the sixth magnetic layer 9, the second magnetic layer 4, the third magnetic layer 5 and the fourth magnetic layer 6 with the temperature plotted as the abscissa. Since the magnetic layers are each composed of a rare earth—transition metal alloy, the magnetization of each magnetic layer may be represented by the sublattice magnetic moment of the rare earth metal, the sublattice magnetic moment of the transition metal, or a total magnetic moment which is a vector sum of these sublattice magnetic moments. The arrows in FIG. 18 each indicate the direction of the sublattice magnetic moment of the transition metal in a magnetic layer.

The magnetization states of the first magnetic layer 3, the second magnetic layer 4, the third magnetic layer 5 and the fourth magnetic layer 6 in the data recording process according to the sixth embodiment are the same as in the first embodiment described with reference to FIG. 3. Therefore, an explanation thereto is herein dispensed with. Further, the fifth magnetic layer 8' assumes the same magnetization states as in the third embodiment, and the sixth magnetic layer 9 assumes the same magnetization states as in the fourth embodiment.

In accordance with the present invention, since the magnetization direction of the second magnetic layer is determined by the direction of a magnetic field from the fourth magnetic layer at a temperature not lower than the Curie point of the first magnetic layer, the light modulation overwriting can be achieved without application of an external magnetic field. Therefore, the construction of a magneto-optical recording apparatus can be simplified.

Where the fifth magnetic layer having a Curie point higher than the first magnetic layer and exhibiting a perpendicular magnetic anisotropy at a temperature not lower than the second temperature is provided adjacent to the first magnetic layer on a side opposite from the second magnetic layer, the magneto-optical recording medium has an improved signal reproduction characteristic. Further, the record mark length can be reduced.

Further, where the sixth magnetic layer exhibiting a perpendicular or in-plane magnetic anisotropy of a smaller degree than the second magnetic layer at room temperature and adapted to be copied with the magnetization state of the second magnetic layer at a temperature near the Curie point of the first magnetic layer is provided between the first magnetic layer and the second magnetic layer, the magnetization of the first magnetic layer is prevented from being oriented in the same magnetization direction of the second magnetic layer at room temperature. This ensures smooth light modulation overwriting.

What is claimed is:

1. A magneto-optical recording medium comprising a first magnetic layer, a second magnetic layer, a third magnetic layer and a fourth magnetic layer formed one on another in this order, the first magnetic layer, the second magnetic layer, the third magnetic layer and the fourth magnetic layer have Curie points Tc1, Tc2, Tc3 and Tc4, respectively, which satisfy a condition of Tc3<Tc1<Tc2<Tc4, and exhibit a perpendicular magnetic anisotropy in a temperature range between room temperature and their respective Curie points, wherein the first magnetic layer is adapted to be copied with a magnetization state of the second magnetic layer at a temperature higher than a first temperature, but not copied at a temperature not higher than the first temperature, the first temperature being defined as a temperature between room temperature and the Curie point Tc1, the third magnetic layer is adapted to be copied with a magnetization state of the fourth magnetic layer at least at room temperature, and the second magnetic layer is adapted to be copied with a magnetization state of the third magnetic layer at least at room temperature and to be influenced by a magnetic field from the fourth magnetic layer so as to have a magnetization direction determined by the magnetic field at a temperature higher than the Curie point Tc1.

2. A magneto-optical recording medium of claim 1, wherein the first magnetic layer, the second magnetic layer, the third magnetic layer and the fourth magnetic layer are each composed of a rare earth—transition metal alloy, the first magnetic layer exhibits transition metal rich characteristics, wherein the second magnetic layer exhibits rare earth metal rich characteristics, the third exhibits either transition metal rich characteristics or rare earth metal rich characteristics, and the fourth magnetic layer has its compensation point between room temperature and its Curie point.

3. A magneto-optical recording medium of claim 2, wherein the fourth magnetic layer has a maximum total magnetic moment at a temperature of the Curie point Tc2 of the second magnetic layer, which is between its compensation point and its Curie point Tc4.

4. A magneto-optical recording medium of any of claims 1 to 3, further comprising a fifth magnetic layer provided adjacent to the first magnetic layer on a side thereof opposite from the second magnetic layer, the fifth magnetic layer having a Curie point Tc5 which satisfies a condition of Tc5>Tc1 and being adapted to be copied with a magnetization state of the first magnetic layer at least at a temperature not lower than a second temperature which is defined as a temperature below the Curie point Tc1 of the first magnetic layer.

5. A magneto-optical recording medium of any of claims 1 to 3, further comprising a sixth magnetic layer provided between the first magnetic layer and the second magnetic layer, the sixth magnetic layer exhibiting a perpendicular magnetic anisotropy of a smaller degree than the second magnetic layer or in-plane magnetic anisotropy of at room temperature, and being adapted to be copied with a magnetization state of the second magnetic layer, which is in turn copied to the first magnetic layer, at a temperature not lower than a third temperature which is defined as a temperature between room temperature and the Curie point Tc1 of the first magnetic layer.

6. A magneto-optical recording method for recording and reproducing data on a magneto-optical recording medium including first, second, third and fourth magnetic layers formed one on another in this order, each respectively having Curie points Tc1, Tc2, Tc3 and Tc4, which satisfy a condition of Tc3<Tc1<Tc2<Tc4 and exhibit a perpendicular magnetic anisotropy in a temperature range between room temperature and their respective Curie points, wherein the first magnetic layer is adapted to be copied with a magnetization state of the second magnetic layer at a temperature higher than a first temperature, but not copied at a temperature not higher than the first temperature, the first temperature being defined as a temperature between room temperature and the Curie point Tc1, wherein the third magnetic layer is adapted to be copied with a magnetization state of the fourth magnetic layer at least at room temperature, and wherein the second magnetic layer is adapted to be copied with a magnetization state of the third magnetic layer at least at room temperature and to be influenced by a magnetic field from the fourth magnetic layer so as to have a magnetization direction determined by the magnetic field at a temperature higher than the Curie point Tc1, said magneto-optical recording method comprising the steps of:

irradiating a recording site on the magneto-optical recording medium with a low level laser beam to heat the recording site to higher than a temperature of the Curie point Tc1 of the first magnetic layer; and irradiating the recording site with a high power laser beam to heat the recording site to higher than a temperature of the Curie point Tc2 of the second magnetic layer for light modulation overwriting without application of an external magnetic field.

7. A magneto-optical recording medium of claim 4, further comprising a sixth magnetic layer provided between the first magnetic layer and the second magnetic layer, the sixth magnetic layer exhibiting a perpendicular magnetic anisotropy of a smaller degree than the second magnetic layer or in-plane magnetic anisotropy of at room temperature, and being adapted to be copied with a magnetization state of the second magnetic layer, which is in turn copied to the first magnetic layer, at a temperature not lower than a third temperature which is defined as a temperature between room temperature and the Curie point Tc1 of the first magnetic layer.

* * * * *